United States Patent [19]

Arakawa

[11] Patent Number: 5,010,501
[45] Date of Patent: Apr. 23, 1991

[54] THREE-DIMENSIONAL GEOMETRY PROCESSING METHOD AND APPARATUS THEREFOR

[75] Inventor: Yoshiki Arakawa, Yawata, Japan

[73] Assignee: Matsushita Electric Industrial Co., Ltd., Kadoma, Japan

[21] Appl. No.: 259,826

[22] Filed: Oct. 19, 1988

[30] Foreign Application Priority Data

Oct. 20, 1987 [JP] Japan .................. 62-264411

[51] Int. Cl.$^5$ .................................. G06F 15/62
[52] U.S. Cl. .................. 364/522; 364/518; 364/521; 340/750; 340/799
[58] Field of Search .............. 364/518, 521, 522; 340/729, 747, 723, 798, 799, 750; 382/25, 28

[56] References Cited

U.S. PATENT DOCUMENTS

| | | | |
|---|---|---|---|
| 4,649,498 | 3/1987 | Kedem et al. | 364/518 |
| 4,766,556 | 8/1988 | Arakawa | 364/522 |
| 4,790,028 | 12/1988 | Ramage | 382/47 |
| 4,791,583 | 12/1988 | Colburn | 364/522 |
| 4,807,158 | 2/1989 | Blanton et al. | 364/521 |
| 4,811,244 | 3/1989 | Shimada et al. | 364/521 |

OTHER PUBLICATIONS

"HICAD/FEM", Hitachi Computer Aided Design Systems for Finite Elemental Method, pp. 21-30, Feb. 1987.
I-DEAS Supertab Engineering Analysis Pre- and Post--Processing, Table of Contents and pp. 15-1, 16-6, 1988.

*Primary Examiner*—Gary V. Harkcom
*Assistant Examiner*—Phu R. Nguyen
*Attorney, Agent, or Firm*—Cushman, Darby & Cushman

[57] ABSTRACT

In mesh-generation in which a three-dimensional analysis domain enclosing an object geometry is divided into three-dimensional elements by means of the finite element method, the object geometry or analysis domain is represented by three-dimensional run-length data, and the analysis domain is divided into the elements on the basis of a predetermined rule, elements intersecting with the object geometry are effective and are remained, then nodes of the remained elements are classified into inner node or outer nodes, and the outer nodes are shifted onto the surface of the object geometry by "fitting process", thus mesh-generation of the three-dimensional geometry is automatized.

3 Claims, 19 Drawing Sheets (General Art)

(General Art)

(General Art)

THREE-DIMENSIONAL GEOMETRY PROCESSING METHOD AND APPARATUS THEREFOR

FIELD OF THE INVENTION AND RELATED ART STATEMENT

1. Field of the Invention

The present invention relates generally to a three-dimensional geometry processing method and an apparatus therefor, and more particularly to a method and an apparatus for automatizing division of analysis domain or an object geometry for analyzing and generation of element geometries (hereinafter is referred to as "mesh-generation") in numerical analysis using a finite element method.

2. Description of the Related Art

Recently, numerical analysis using a finite element method have been accepted as the most generalized analysis method in wide fields such as structure analysis, fluid analysis, analysis of magnetic field or analysis of heat conduction, and occupies important position in these fields.

In numerical analysis using the finite element method, an object domain for analyzing or a solid geometry must be divided into some suitable element geometries, and data representing the element geometries are created. Such the process is called as "mesh-generation".

Mesh-generation is relatively easy in two dimensional numerical analysis, and is largely automated to enhance efficiency. Then various method have been developed, and softwares for creating the analysis data (preprosessor) using these methods have been widely provided. Mesh-generation of a two dimensional geometry can be completely automated in higher efficiency by using these preprocessors.

On the other hand, automatizing of mesh-generation in three-dimensional numerical analysis is very difficult. The following method is practical and popular at the present state of technology.

At first, in this method as shown in FIG. 1(a) a solid geometry 20 which is an object to analyze is defined.

Secondly, the solid geometry 20 is divided into several sub-geometries 21 which are relatively simple and "good-natured" as shown in FIG. 1(b). The "good-natured" sub-geometry means that the sub-geometry 21 has no hole therein, and has two surfaces facing to each other, for example. Division of the solid object 20 is accomplished by manual operation.

Thirdly, automatic mesh-generation is applied to the respective sub-geometries 21 as shown in FIG. 1(c).

In the above-mentioned conventional method, there are various rules to divide a solid geometry into sub-geometries, for example the sub-geometry must be a hexahedron, and thereby automatizing of mesh-generation is subjected to restriction. Moreover, in a complicated solid geometry, division of the solid geometry is troublesome operation and difficult in divisional method.

OBJECT AND SUMMARY OF THE INVENTION

An object of the present invention is to provide a three-dimensional geometry processing method and an apparatus therefor for realizing automated mesh-generation of a complicated solid geometry with simplified operation.

The three-dimensioned geometry processing method comprises the steps of:

representing a three-dimensional object geometry by three-dimensional run-length data representation, dividing an analysis domain enclosing the three-dimensional object geometry into a plurality of elements of three-dimensional geometry, examining intersection of the elements and the three-dimensional object geometry on the basis of the run-length data, selecting all elements enclosed in the three-dimensional object geometry and all elements intersecting with the three-dimensional object geometry, creating data of nodes of the selected elements, selecting nodes which are present outside of the three-dimensional object geometry, shifting the nodes which are present outside of the three-dimensional object geometry onto the surface of the three-dimensional object geometry on the basis of a first predetermined rule, examining shape of elements wherein nodes are shifted onto the three-dimensional object geometry, and selecting elements of shape conforming to a second predetermined rule.

The three-dimensional run-length data representation, as shown in FIG. 2(a) and FIG. 2(b), is the method for representing a three-dimensional geometry with integration of the intersection data which are created by sequential scanning along predetermined scanning lines (straight lines which are parallel to Y-axis in FIG. 2(b)). The three-dimensional geometry is represented by one-dimensional list-structure data having a fixed length as shown in FIG. 2(c). Consequently, the data structure is preferable to computer processing. The above-mentioned three-dimensional run-length data representation is disclosed in more detail in the U.S. Pat. No. 4,766,556 by the same inventor as the present invention.

In the present invention, an as shown in FIG. 3(a), an object geometry 41 is defined with three-dimensional run-length data representation in an analysis domain 40. Subsequently, the analysis domain 40 is divided into mesh (FIG. 3(b)). For example, the analysis domain 40 is divided into a plurality of elements 45 of tetrahedral shape. Then elements 45 intersecting with the three-dimensional geometry 41 are detected on the basis of the three-dimensional run-length data (FIG. 3(c)).

Nodes 42 of elements 45 which are present outside of the three-dimensional geometry 41 are distinguished from nodes 43 which are present on or inside of the boundary of the three-dimensional geometry 41 on the basis of the three dimensional run-length data (FIG. 3(d)). Then the external node 42 is shifted on the boundary of the three-dimensional geometry on the basis of a predetermined rule using the three-dimensional run-length data (FIG. 3(e)), and the three-dimensional geometry is automatically represented by a plurality of elements. This process is designated as "fitting process". Finally, a volume of the element 45 which is deformed through the fitting process is examined, and if the volume is zero, such element is deleted, since the element having no volume is ineffective to represent the three-dimensional geometry. Thus element data and node data of effective elements are obtained.

DESCRIPTION OF THE PREFERRED EMBODIMENTS

Figure 5:
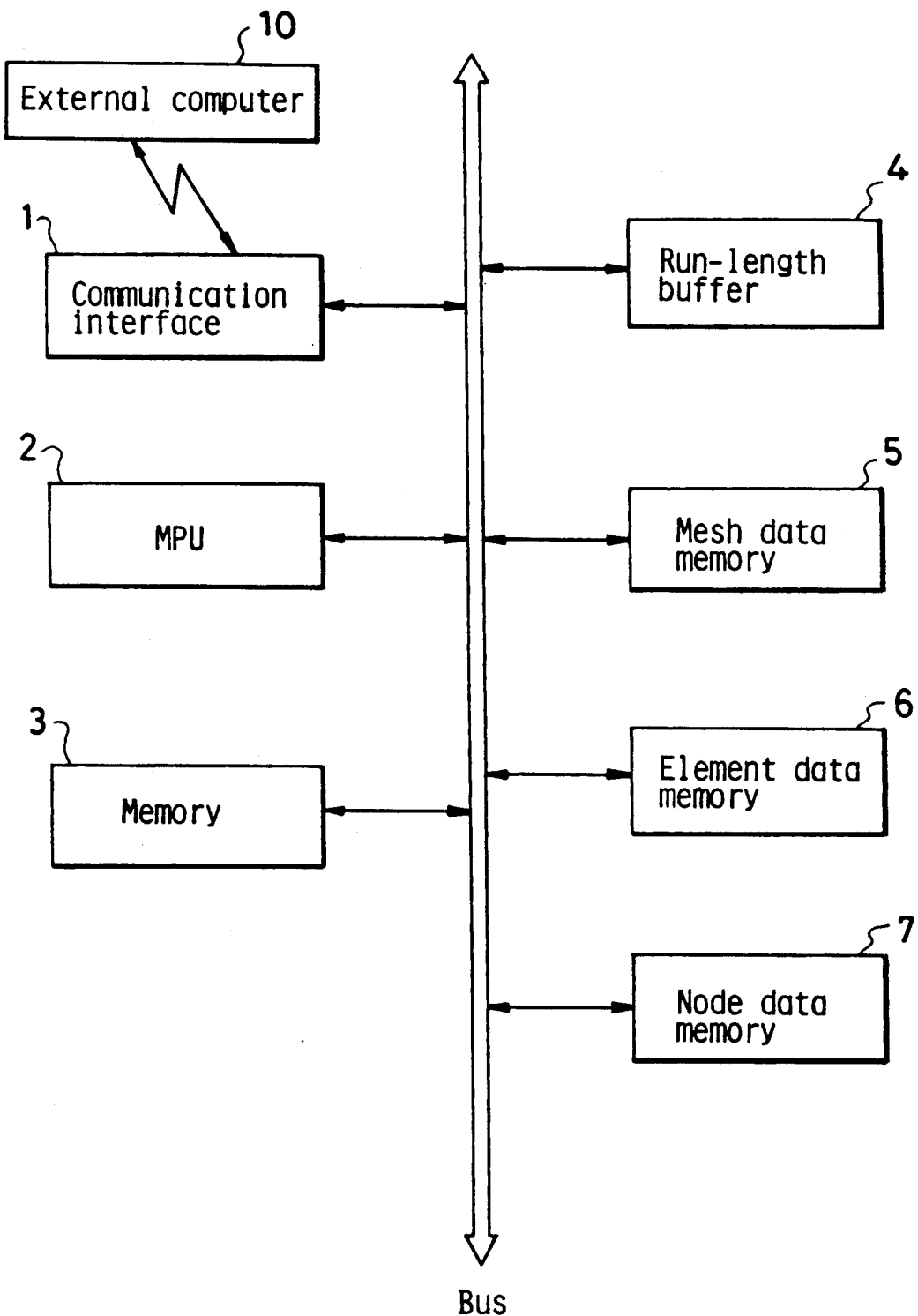
FIG. 5 is a block diagram of a first embodiment of the three dimensional geometry processing apparatus in accordance with the present invention.

FIG. 5 is a block diagram showing a complete apparatus of a first embodiment in accordance with the present invention. Referring to FIG. 5, a communication interface 1 receives three-dimensional run-length data and mesh-data for dividing an analysis domain 40 from an external apparatus such as an external computer system, and transmits element data and node data which are obtained by the apparatus to the external apparatus. The three-dimensional run-length data are processed by a microprocessor unit 2 (hereinafter abbreviated as MPU). A memory 3 memories various intermediate data generated in the apparatus for a time, and a run-length buffer 4 memorizes the three-dimensional run-length data. A mesh-data memory 5 memorizes the mesh-data, an element data memory 6 memorizes element data, and a node data memory 7 memorizes node data.

Figure 11:
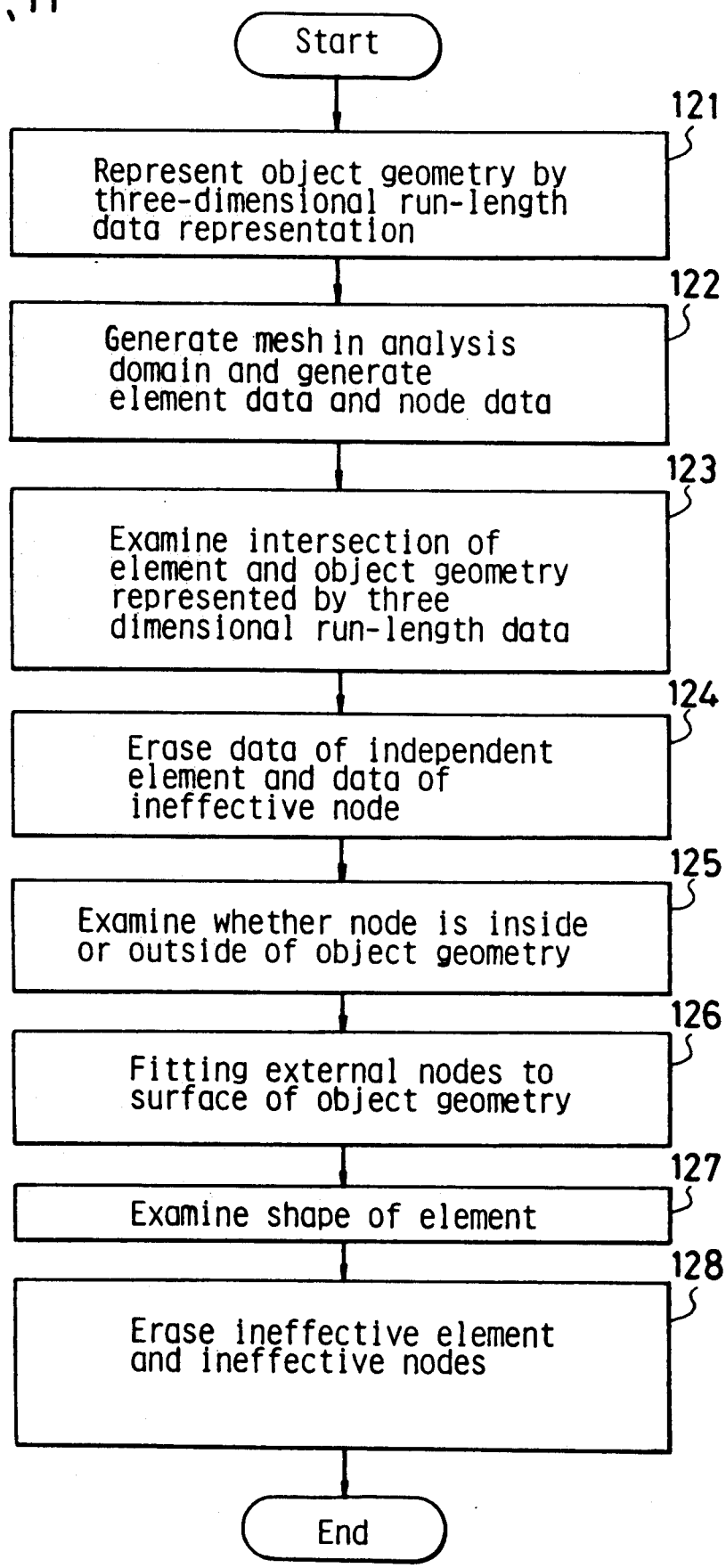
FIG. 11 is a flow chart of a fundamental process of the present invention.

FIG. 11 is a flow chart showing a fundamental process of the present invention. The three-dimensional geometry processing method and operation of the apparatus are elucidated hereinafter. The fundamental process is composed of the step 121 for representing an object geometry by three-dimensional run-length data, the step 122 for generating mesh-data, element data and node data in an analysis domain, the step 123 for examining intersection of an element and the object geometry, the step 124 for erasing data of independent element and data of ineffective node, the step 125 for examining whether a node is inside or outside of the object geometry, the step 126 for fitting external nodes to the surface of the object geometry, the step 127 for examining shape of the element and the step 128 for erasing ineffective elements and ineffective nodes.

Figure 3A:
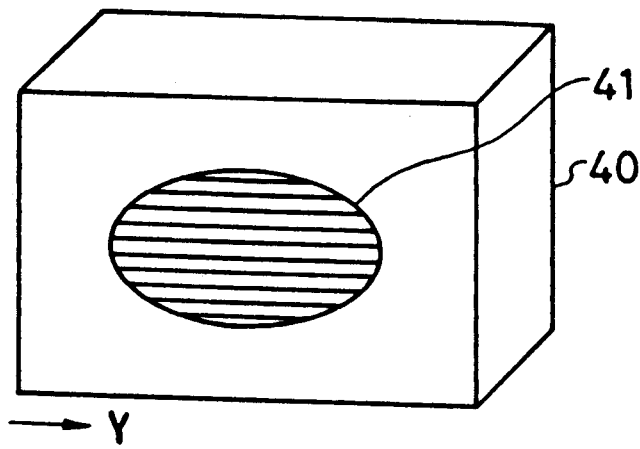
FIG. 3(a) is a perspective view of an analysis domain including a three-dimensional object geometry.

As shown in FIG. 3(a), an object geometry 41 in the analysis domain 40 is represented by the three-dimensional run-length data which is shown in the prior art by the same inventor, and the three-dimensional run-length data is memorized in the run-length buffer 4 through the communication interface 1. The object geometry 41 is defined by an integration of three-dimensional element geometries (primitive) such as parallelepiped, column or cone. These element are converted into the three-dimensional run-length data, and the data representing the three-dimensional geometry is created by mean of arrangement of overlap of the three-dimensional run-length data.

Figure 4A:
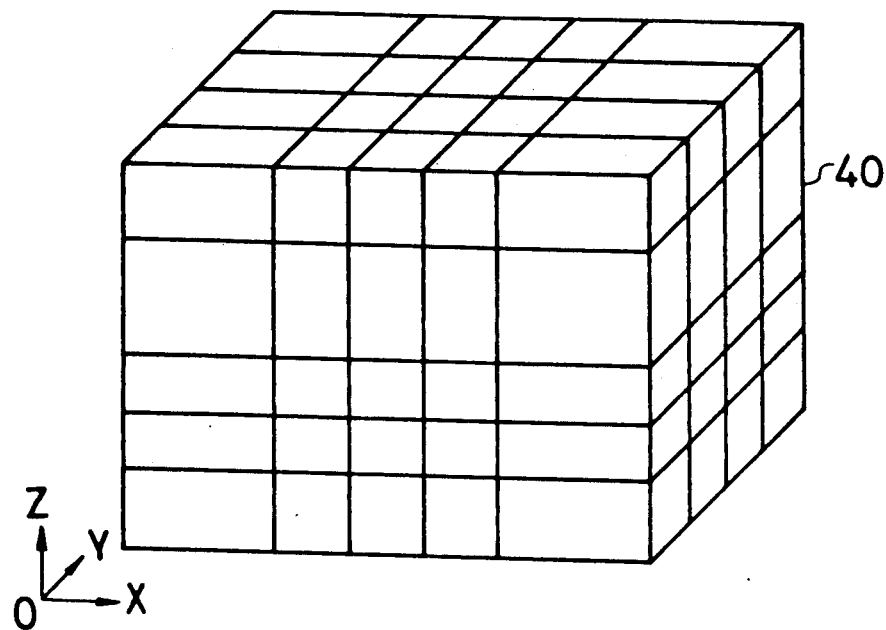
FIG. 4(a) is a perspective view of a three-dimensional geometry showing an example of a mesh-division method.

In a first embodiment of the present invention, the analysis domain 40 is divided into tetrahedrons. As shown in FIG. 4(a), first, the analysis domain 40 is divided into planes which are perpendicular to the respective coordinate axes. Therefore, mesh-data are represented by equations of the divided planes, namely coordinate values of the respective axes are employed as the mesh-data in the embodiment.

The mesh-data of the analysis domain 40 are memorized in the mesh-data memory 5 through the communication interface 1.

Figure 4B:
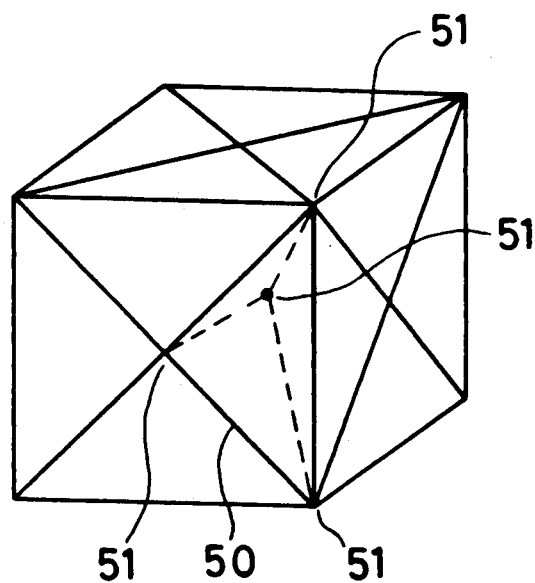
FIG. 4(b) is a perspective view of the three dimensional geometry having tetrahedral divisions.
Figure 4C:
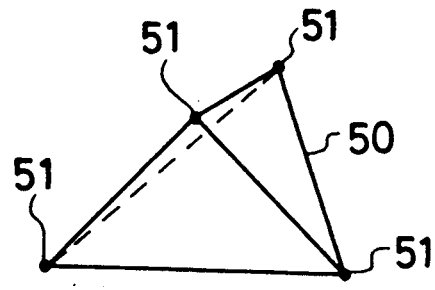
FIG. 4(c) is a perspective view of a tetrahedron element.

A parallelepiped which is generated by mesh division is divided into twenty four tetrahedrons 50 as shown in FIG. 4(b). FIG. 4(c) is a perspective view of a tetrahedron which is designated as "element". The respective apexes of the tetrahedron 50 are numbered in a suitable order, and the apexes are named as nodes 51 as shown in FIG. 4(c). Topology data of the tetrahedron 50 which is composed of node numbers of the tetrahedron are memorized in the element data memory 6. Moreover, the coordinate values of the apexes are memorized in the node data memory 7 as shown in FIG. 5.

The MPU 2 reads out sequentially the element data and the three-dimensional run-length data from the element data memory 6 and the run-length buffer 4, respectively, and intersections of both the data are examined. In the process, elements 45b which do not intersect with any three-dimensional run-length data are erased from the element data memory 6. After this process, the elements 45a which intersect with the object geometry 41 remain, and the elements 45b which do not intersect with the object geometry are erased as shown in FIG. 3(c). Moreover, only the node data composed of elements remaining in the element data memory 6 are memorized in the node data memory 7, and data of other nodes are erased on the MPU 2.

Subsequently, the MPU 2 reads out sequentially the node data and the three-dimensional run-length data from the node data memory 7 and the run-length buffer 4, respectively, and examines whether the node is present inside or outside of the object geometry represented by the three-dimensional run-length data in comparison between both the data. The respective node data classified by the above-mentioned process are memorized in the node data memory 7. As shown in FIG. 3(d), the node 42 is present outside of the object geometry 41, and the node 43 is present inside thereof. Moreover, the MPU 2 reads out sequentially all the nodes which are present outside of the object geometry 41 and the run-length data from the node data memory 7 and the run-length buffer 4, respectively, and distances between the node and the run-length data which are located adjacent to the node are calculated. Then, the nearest run-length to the node in distance is selected and the coordinate value of the nearest point on the run-length to the node is calculated on the basis of the run-length data.

Figure 3B:
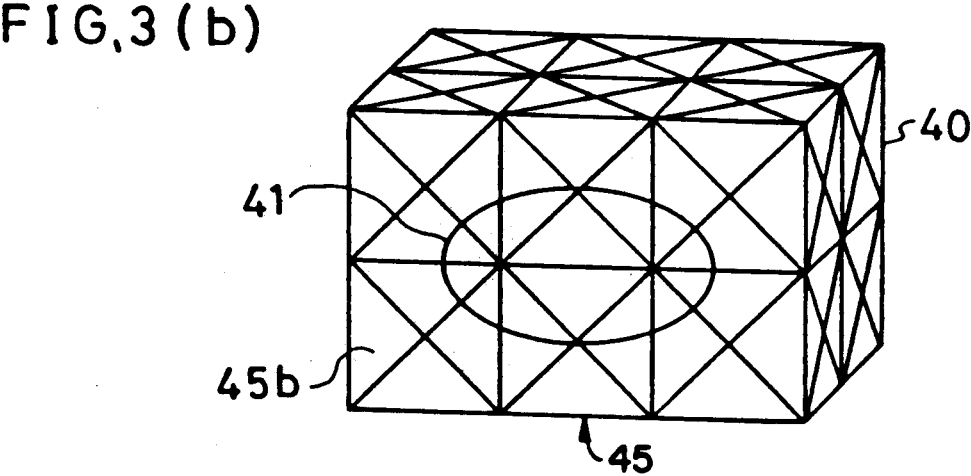
FIG. 3(b) is a perspective view of the analysis domain divided into elements of tetrahedral shape.
Figure 3C:
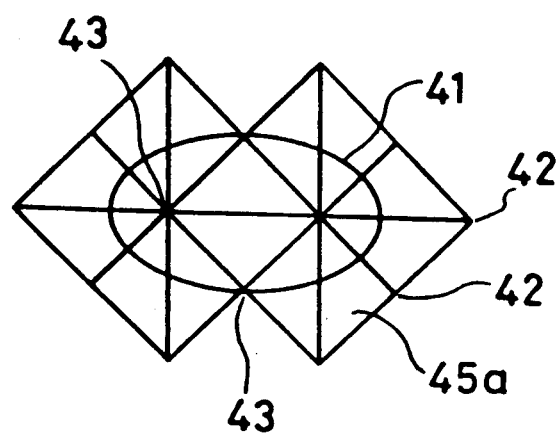
FIG. 3(c) is a plan view of the object geometry which is represented with the elements.
Figure 3D:
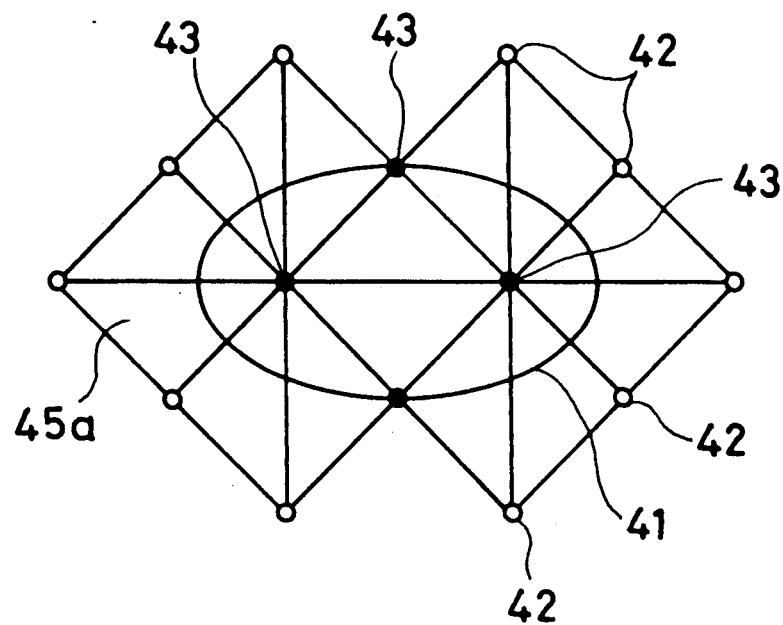
FIG. 3(d) is a plan view of the object geometry showing position of nodes.
Figure 3E:
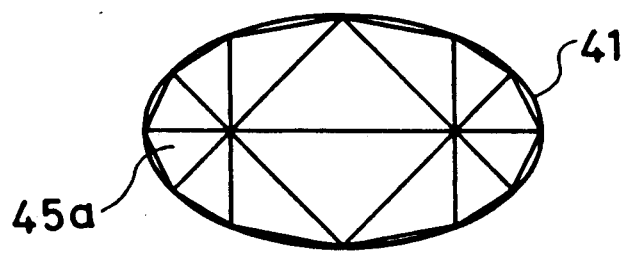
FIG. 3(e) is a plan view of the object geometry wherein a first fitting process is applied to the respective elements.
Figure 3F:
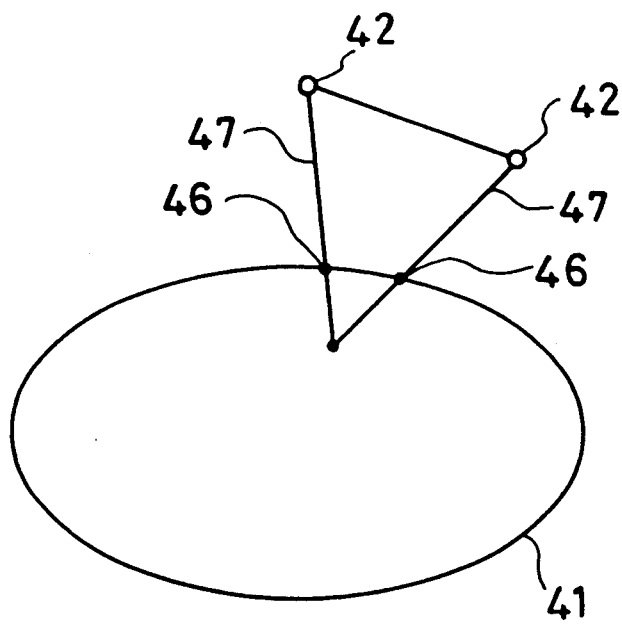
FIG. 3(f) is a plan view of the object geometry wherein a second fitting process is applied to the respective elements.

Subsequently, the node is shifted to a position corresponding to the nearest run-length on the MPU 2 as shown in FIG. 3(e). Namely, the coordinate value of the node 42 which is present outside of the object geometry 41 is replaced by the coordinate value which is minimum in distance between the node and the object geometry. Then the node data which is changed in the coordinate value is written in the node data memory 7. Consequently, the protruded portions of the respective elements 45a of tetrahedrous tetrahedron which are present outside of the object geometry 41 are deformed as shown in FIG. 3(e), and the object geometry 41 is approximately represented by integration of the tetrahedral elements.

Finally, the MPU 2 reads out only the deformed elements from the element data memory 6, and examines the volume of the respective elements. Then the element having no volume is erased from the element data memory 6. Furthermore, ineffective nodes of the element having no volume are also erased from the node data memory 7.

Figure 3G:
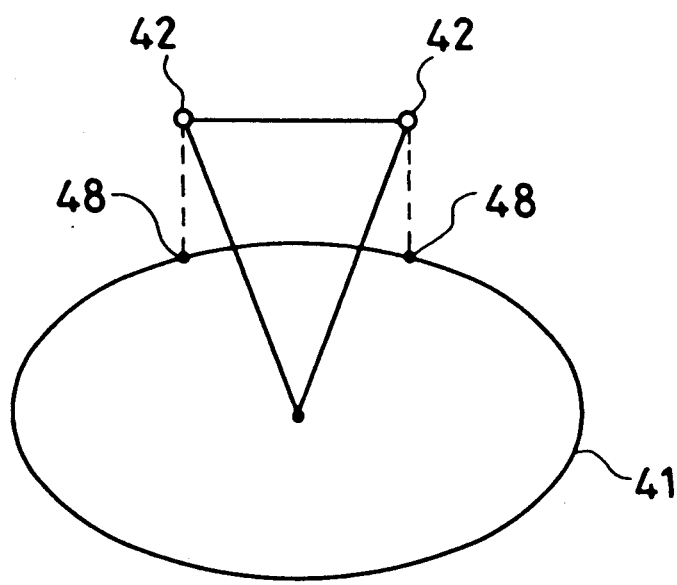
FIG. 3(g) is a plan view of the object geometry wherein a third fitting process is applied to the respective elements.

As a result, the object geometry 41 is automatically divided into the tetrahedral elements. In the embodiment, nodes 42 which are present outside of the object geometry are shifted on the nearest surface of the object geometry. Alternatively, as shown in FIG. 3 (f), the nodes 42 can be shifted to intersections 46 of the object geometry 41 and sides 47 of the element. On the other hand, as shown in FIG. 3(g), the nodes 42 which are present outside of the object geometry can be shifted to the surface 48 of the object geometry 41 along a predetermined coordinate axis. Furthermore, the mesh-data can be created on the basis of other division method as replacement for the parallelpiped division method.

The examination process of intersection of an element and three-dimensional run-length data is elucidated in more detail hereinafter.

In order to aid the elucidation, an equation for examining intersection of a tetrahedron and run-length data (straight line) is introduced. In the equation, four apexes of the tetrahedron are represented by $P_0(x_0, y_0, z_0)$, $P_1(x_1, y_1, z_1)$, $P_2(x_2, y_2, z_2)$, $P_3(x_3, y_3, z_3)$, and the run-length data represents a straight line connecting between a position $(x, y_1, z)$ and a position $(x, y_2, z)$. In the above-mentioned operation, though the run-length data is set in parallel with the Y-axis, thereby generalization of the processing method may not be restricted.

Under the above-mentioned situation, a point $(x, y, z)$ which is present in the tetrahedron is represented by the equation $$\begin{pmatrix} x \\ y \\ z \end{pmatrix} = \begin{pmatrix} a_1 a_2 a_3 \\ b_1 b_2 b_3 \\ c_1 c_2 c_3 \end{pmatrix} \begin{pmatrix} r \\ s \\ t \end{pmatrix} + \begin{pmatrix} x_0 \\ y_0 \\ z_0 \end{pmatrix}. \tag{1}$$

wherein, the matrix of the first term of the right side is represented by the equation $$\begin{pmatrix} a_1 a_2 a_3 \\ b_1 b_2 b_3 \\ c_1 c_2 c_3 \end{pmatrix} = \begin{pmatrix} (x_1 - x_0)(x_2 - x_0)(x_3 - x_0) \\ (y_1 - y_0)(y_2 - y_0)(y_3 - y_0) \\ (z_1 - z_0)(z_2 - z_0)(z_3 - z_0) \end{pmatrix} = A. \tag{2}$$

Various r, s and t are shown in the following relations;

$$\left. \begin{array}{l} 0 \leq r \\ 0 \leq s \\ 0 \leq t \\ r + s + t \leq 1 \end{array} \right\} \tag{3}$$

The equation (1) is rewritten as shown in the following equation $$\begin{pmatrix} r \\ s \\ t \end{pmatrix} = \begin{pmatrix} a_1 a_2 a_3 \\ b_1 b_2 b_3 \\ c_1 c_2 c_3 \end{pmatrix}^{-1} \begin{pmatrix} x - x_0 \\ y - y_0 \\ z - z_0 \end{pmatrix} = \begin{pmatrix} h_{11} h_{12} h_{13} \\ h_{21} h_{22} h_{23} \\ h_{31} h_{32} h_{33} \end{pmatrix} \begin{pmatrix} x' \\ y' \\ z' \end{pmatrix} = HP'. \tag{4}$$

Therefore, a range of a coordinate value y of the scanning line $x=x$, $z=z$ is obtained from the equation (4) as shown in the equation (5).

$$\begin{pmatrix} r \\ s \\ t \end{pmatrix} = \begin{pmatrix} h_{11} h_{12} h_{13} \\ h_{21} h_{22} h_{23} \\ h_{31} h_{32} h_{33} \end{pmatrix} \begin{pmatrix} x - x_0 \\ y - y_0 \\ z - z_0 \end{pmatrix}. \tag{5}$$

Then a set of equations (6) is obtained from the equation (5) and the equation (3), and the range of the coordinate value y is calculated by following relations;

$$0 \leq h_{11}(x - x_0) + h_{12}(y - y_0) + h_{13}(z - z_0)$$
$$0 \leq h_{21}(x - x_0) + h_{22}(y - y_0) + h_{23}(z - z_0)$$
$$0 \leq h_{31}(x - x_0) + h_{32}(y - y_0) + h_{33}(z - z_0)$$
$$h_{11}(x - x_0) + h_{12}(y - y_0) + h_{13}(z - z_0) + h_{21}(x - x_0) +$$
$$h_{22}(y - y_0) + h_{23}(z - z_0) + h_{31}(x - x_0) + h_{32}(y - y_0) +$$
$$h_{33}(z - z_0) \leq 1$$
(6)

In case that the coordinate value is in a range represented by a relation $$y_{min} \leq y \leq y_{max} \qquad (7)$$

intersection of run-length data $(x_1, y_1, z)$-$(x, y_2, z)$ and the tetrahedron can be examined by the following examination relation (8)

$$(y_{min} \leq y_2) \text{ and } (y_1 \leq y_{max}) \qquad (8).$$

When the relation (8) is satisfied, the runlength data intersects with the tetrahedron. When it is not satisfied, the run-length data not intersect with the tetrahedron.

Figure 6:
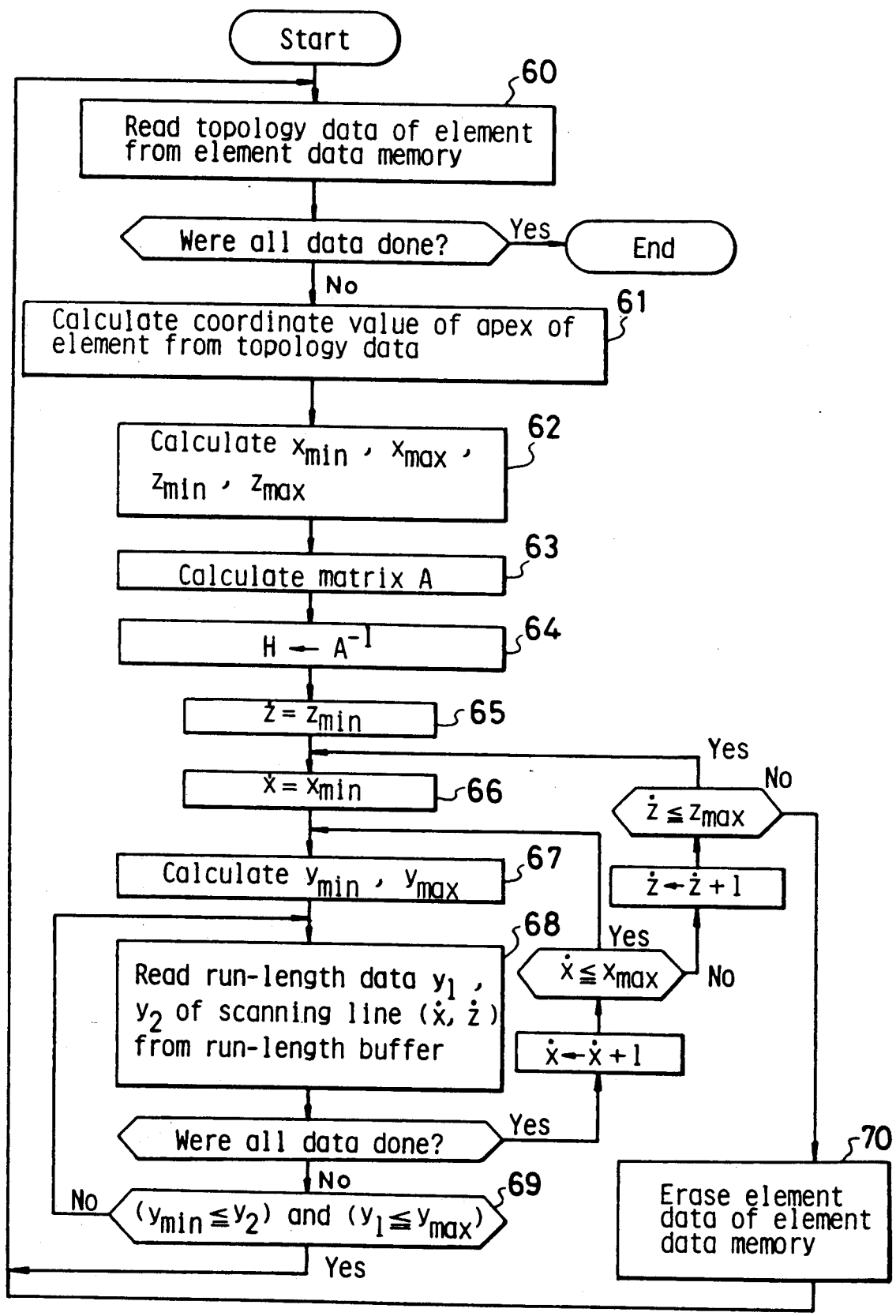
FIG. 6 is a flow chart of a process for examining intersection between an element and run-length data.

FIG. 6 is a flow chart showing the examination process of intersection of an element and three-dimensional run-length data.

Firstly, topology data of an element are sequentially read out from the element data memory (step 60). Then, coordinate values of the respective apexes of the element are obtained from the topology data by processing data of the node data memory (step 61), Secondly, coordinate values of x-axis and z-axis of these four apexes are compared with each other, and ranges of the respective coordinate values of x-axis and z-axis of the element in the defined domain as shown in the following relations (8A) are calculated (step 62).

$$(x_{min} \leq x \leq x_{max}), (z_{min} \leq z \leq z_{max}) \qquad (8A).$$

Moreover, the matrix A of the equation (2) is obtained from the coordinate values of the four apexes using the equation (2) (step 63), and an inverse matrix H of the matrix A is also calculated (step 64). The scanning line (x,z) is set to an initial value $(x_{min}, z_{min})$ (step 65, 66). The range of the coordinate value of y-axis of the tetrahedron along the scanning line (x, z) is calculated by the equations (6) (step 67).

Thirdly, run-length data $y_1$, $y_2$ of the scanning line (x, z) are read out from the run-length buffer (step 68). Both the data are compared with each other, and intersection of the element and the run-length data is examined (step 69). When both the data intersect, the step returns to the step 60 and next successive element is read out, and the above-mentioned process is repeated. When both the data do not intersect, other run-length data are read out, and examination of intersection is sequentially repeated (step 68, 69).

After examination of intersection with respect to all run-length data on the scanning lines included in the range defined by the following relations (8B):

$$(x_{min} \leq x \leq x_{max}), (z_{min} \leq z \leq z_{max}) \qquad (8B),$$

if no run-length data intersect the element, the element data of the element are erased from the element memory (step 70). Then element data of a successive element are read out at step 60, and the above-mentioned process is repeated; the above-mentioned steps are applied to all the element data.

Figure 7:
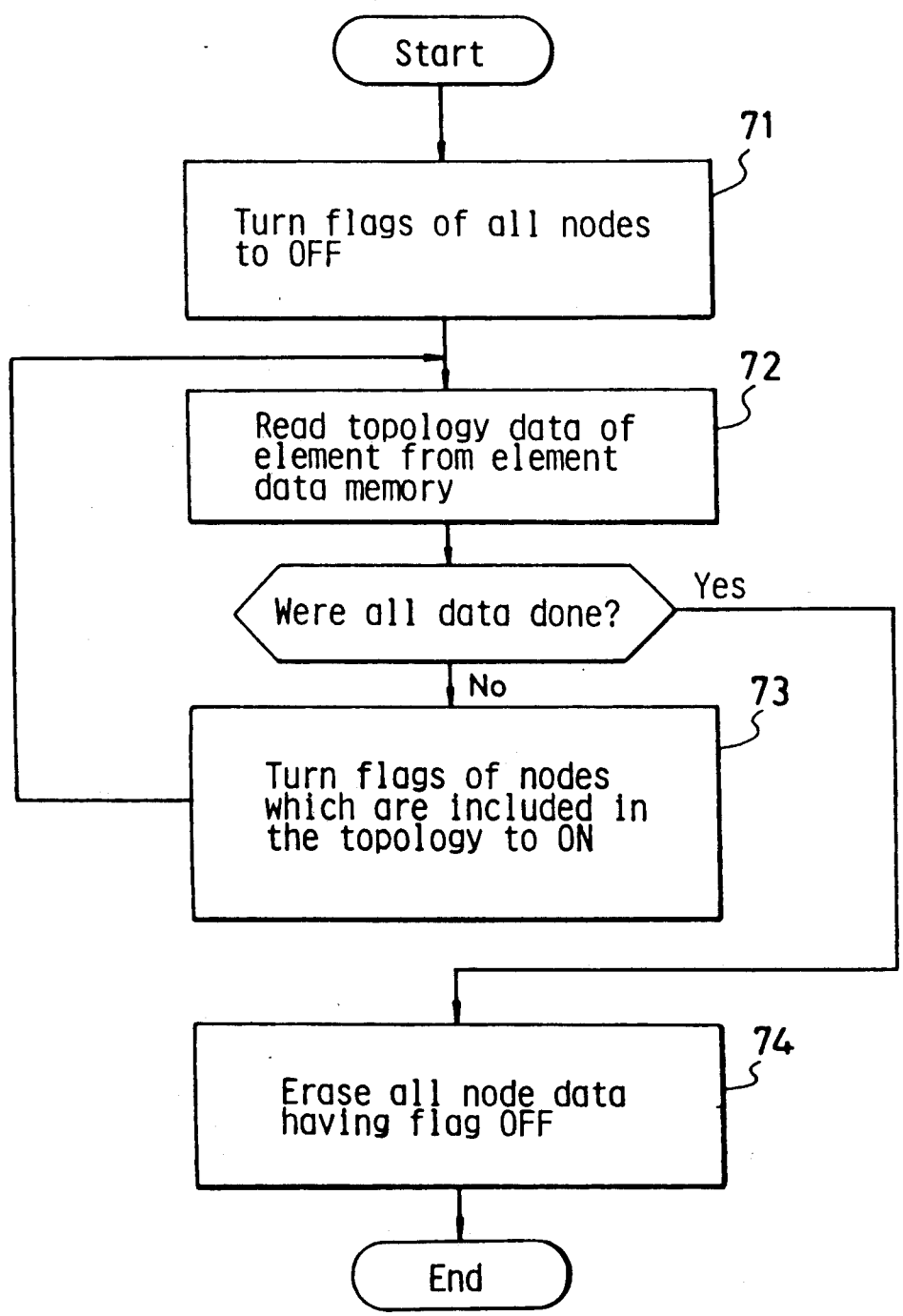
FIG. 7 is a flow chart of a process for erasing independent nodes.

FIG. 7 is a flow chart showing a selecting process of independent nodes of the elements which have not intersected the three-dimensional geometry 41 and have been erased from the element data memory 6, prior to the selecting process. Firstly, all flags of node data on the node data memory 7 are made OFF (step 71). Secondly, topology data of an element is read out from the element data memory 6 (step 72). The flag of the node data on the node data memory 7 composing the topology data is made ON (step 73). The above-mentioned steps 72 and 73 are applied to all the element data. After the process, node data having flag OFF are erased from the node data memory 7 (step 74).

A process for examining position of a node is elucidated in more detail. In the process, it is examined whether or not the node is inside of the three-dimensional geometry. In the present invention, the three dimensional geometry is represented by three-dimensional run-length representation, and run-length data are represented on the basis of a quadrangular prism a shown in FIG. 2(b). Therefore, it is examined whether the node is inside of the quadrangular prism or not. The domain which is occupied by the quadrangular prism is defined by the following relations (9A);

$$x \leq x \leq x+d, y_1 \leq y \leq y_2, z \leq z \leq z+d \qquad (9A).$$

When coordinate value of the node is represented by $(x_0, y_0, z_0)$, the position of the node is examined by relation (9B);

$$\begin{aligned} &(x \leq x_0 \leq x + d) \\ &\text{and} \\ &(y_1 \leq y_0 \leq y_2) \\ &\text{and} \\ &(z \leq z_0 \leq z + d) \end{aligned} \qquad (9B)$$

In the relations 9B, when the respective values are satisfactory for all the relations (9B), the node is present inside of the three dimensional geometry, and when at least one of the relations (9B) has not been satisfied, the node is present outside of the three-dimensional geometry, wherein, a character "d" designates an interval between neighboring two scanning lines.

Figure 8:
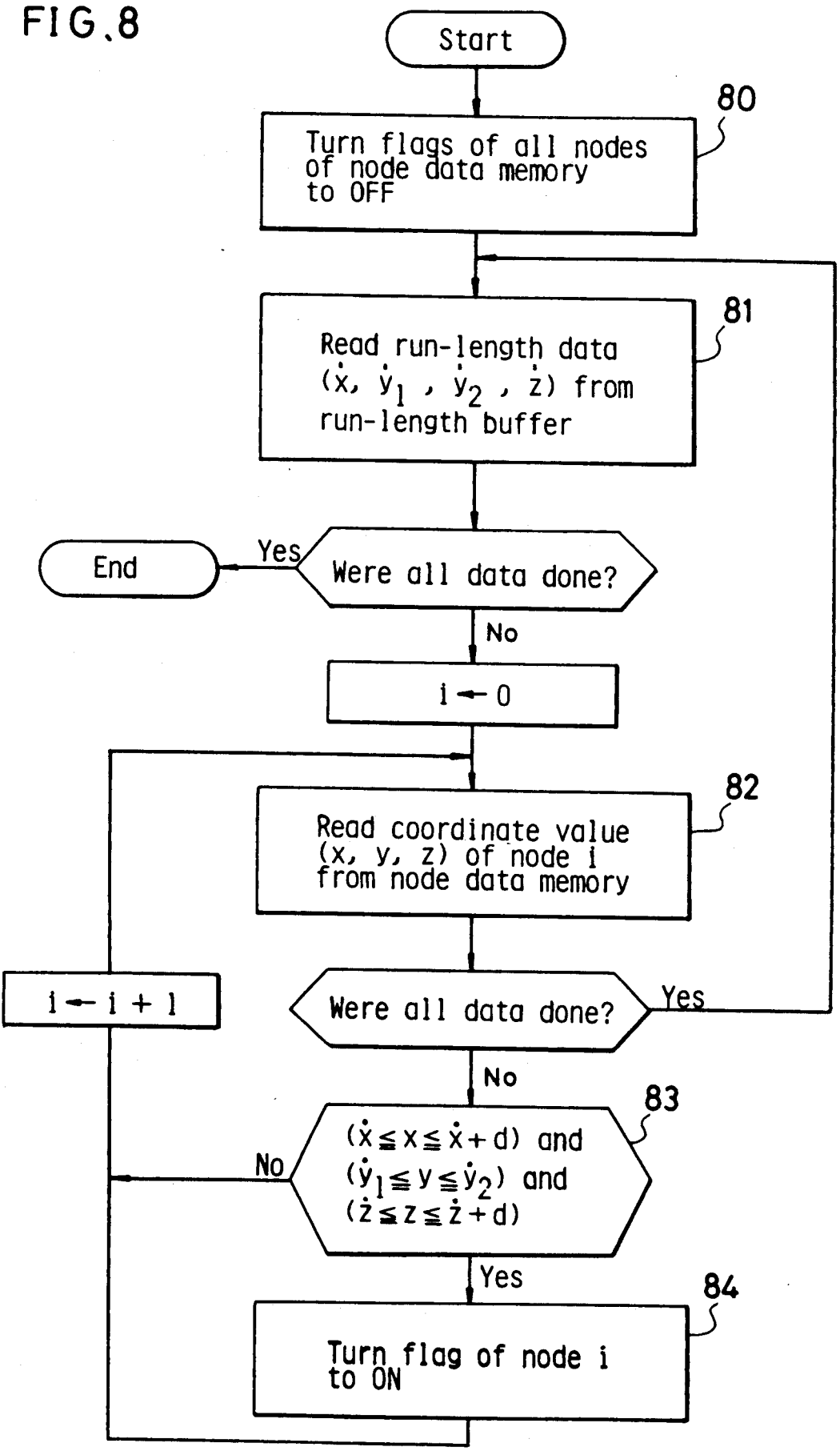
FIG. 8 is a flow chart of a process for examining position of dependent nodes.

FIG. 8 is a flow chart showing the process for examining the position of the node.

Firstly, flags of all node data on the node data memory 7 are turned to OFF (step 80). Run-length data (x, $y_1$, $y_2$, z) are sequentially read out from the run-length buffer 4 (step 81). Moreover, coordinate values (x, y, z) of a node "i" (i=0, 1, 2, ...) are read out from the node data memory 7 (step 82). Subsequently, it is examined whether the respective nodes are present inside of the three-dimensional geometry or not (step 83), and flags of which the node is inside the three-dimensional geometry are turned to ON (step 84), flags of which the nodes are present outside the three-dimensional geometry remain OFF. The above-mentioned process from the step 82 to the step 84 is applied to all the nodes. After the step, the sequence returns to the step 81, and other run-length data are read out from the run-length buffer 4 and the same steps are accomplished. The above-mentioned process is applied to all the run-length data, and the respective nodes are classified into "inner nodes" and "outer nodes". Namely, a node having flag ON is the inner node, and a node having a flag OFF is the outer node.

A process for calculating a position on the surface of the three-dimensional geometry which is minimum in distance from the above-mentioned outer node to the surface of the three-dimensional geometry is elucidated in more detail hereinafter. In a similar manner as mentioned above, since the three-dimensional geometry is represented by three-dimensional run-length data representation, the position on the surface of three-dimensional geometry is obtainable by selecting the nearest run-length data to the node.

Figure 9:
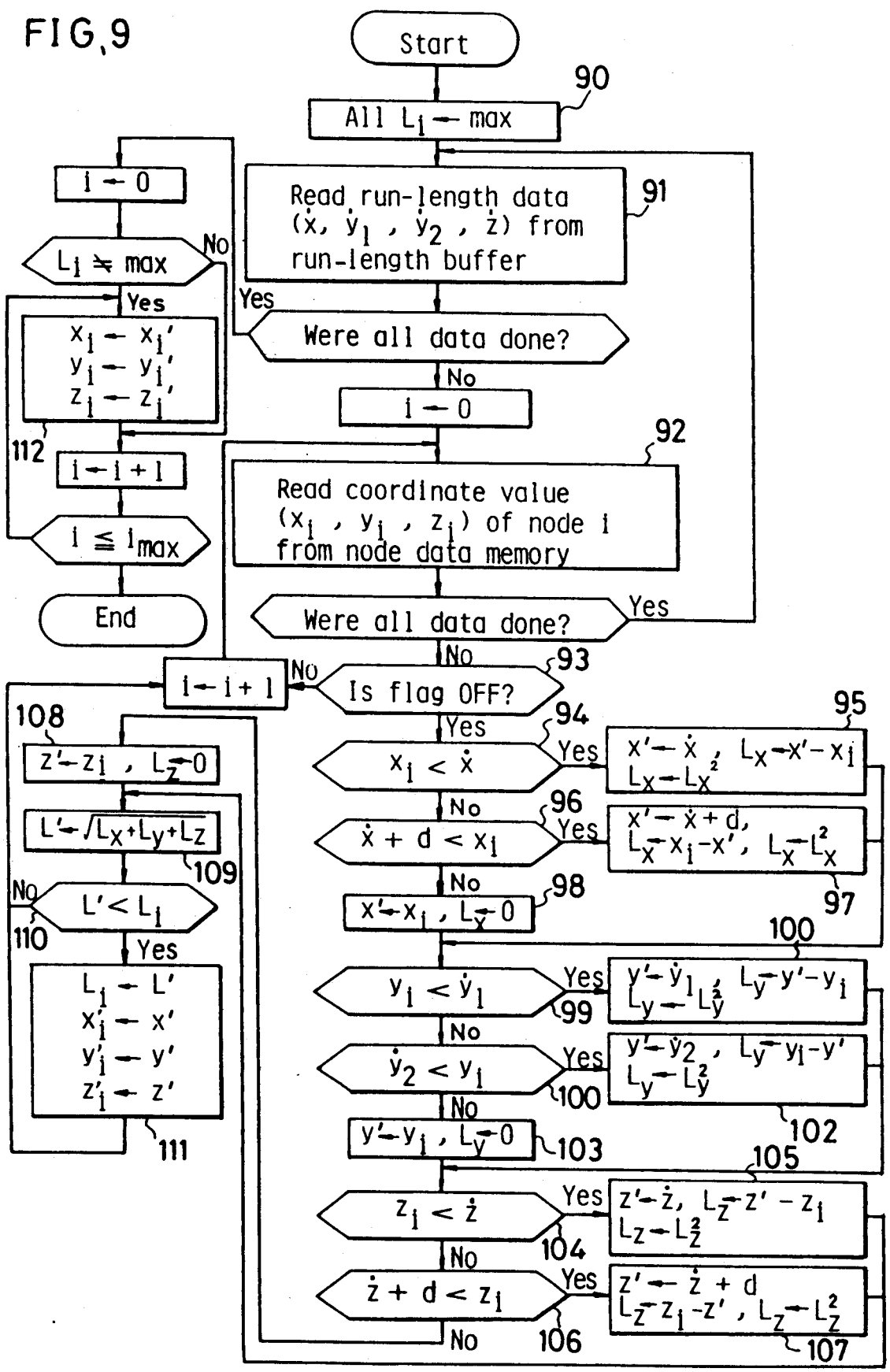
FIG. 9 is a flow chart of a "fitting process" of an external node.

FIG. 9 is a flow chart showing a process to obtain the position on the surface of the three-dimensional geometry.

Firstly, a distance $L_i$ between a node i and run-length data is initialized by substituting a predetermined value "max" for the respective distances $L_i$ (step 90). A relatively large value which is far from the actual value is selected as the value "max".

Secondly, run-length data (x, y$_1$, y$_2$, z) are sequentially read out from the run-length buffer 4 (step 91), and coordinate values ($x_i$, $y_i$, $z_i$) of the node i are sequentially read out from the node data memory 7 (step 92). In case that the flag of the node data is not OFF, i.e. the node is an inner node, the process is returned to the step 92 and is read out the next node data (step 93). In case that the flag of the node data is OFF, i.e. the node is an outer node, a distance L' between a node i ($x_i$, $y_i$, $z_i$) and run-length data (x, y$_1$, y$_2$, z) and a coordinate values (x', y', z') on the run-length data in distance L' are calculated (steps 94–109). Then, the distance L' is compared with the minimum distance $L_i$ with respect to the node i, and when the distance L' is shorter than the distance $L_i$, the distance L' is substituted for the distance $L_i$, and a coordinate value (x', y', z') is substituted for a coordinate value ($x_i'$, $Y_i'$, $z_i'$) on the run-length data (steps 110 and 111). The above-mentioned steps 92–111 are applied to all the node data. After finish of the process of steps 92–111, the process is returned to the step 91, and other run-length data is read out and the same process is applied. The above-mentioned process is applied to all the run-length data.

In the above-mentioned process, a coordinate value ($x_i'$, $y_i'$, $z_i'$) of intersection of the three-dimensional geometry and the shortest line connecting the outer node and the three-dimensional geometry is calculated, and also the shortest distance $L_i$ between the outer node and the three-dimensional geometry is also calculated. Finally, a coordinate value ($x_i'$, $y_i'$, $z_i'$) is substituted for the coordinate value ($x_i$, $y_i$, $z_i$) of the node in which the distance $L_i$ is not equal to the value max (step 112). Consequently, the outer node is shifted on the surface of the three-dimensional geometry. The above-mentioned process is called a "fitting process".

Subsequently, the shape of the element which is processed with the "fitting process" is examined. Shape of some element may be distorted after the fitting process, and an element having no volume is ineffective. Thus in the following process, a volume of the respective elements is calculated, and if an element is found to have no volume by calculation is present, the element is erased from the element data memory 6.

Four apexes of a tetrahedron is represented by coordinate values $P_0(x_0, y_0, z_0)$, $P_1(x_1, y_1, z_1)$, $P_2(x_2, y_2, z_2)$, $P_3(x_3, y_3, z_3)$, respectively, and a volume V of the tetrahedron is given by an equation (10):

$$V = \frac{1}{6} \sqrt{a_1 a_2 a_3 + 2a_{12}a_{23}a_{31} - a_1 a_{23}^2 - a_2 a_{31}^2 - a_3 a_{12}^2} \quad (10)$$

where, the respective values $a_1$, $a_2$, $a_3$, $a_{12}$, $a_{23}$ and $a_{31}$ are represented by relations (11), respectively.

$$\begin{aligned}
a_1 &= (x_1 - x_0)^2 + (y_1 - y_0)^2 + (z_1 - z_0)^2 \\
a_2 &= (x_2 - x_0)^2 + (y_2 - y_0)^2 + (z_2 - z_0)^2 \\
a_3 &= (x_3 - x_0)^2 + (y_3 - y_0)^2 + (z_3 - z_0)^2 \\
a_{12} &= (x_1 - x_0)(x_2 - x_0) + (y_1 - y_0)(y_2 - y_0) + \\
& \quad (z_1 - z_0)(z_2 - z_0) \\
a_{23} &= (x_2 - x_0)(x_3 - x_0) + (y_2 - y_0)(y_3 - y_0) + \\
& \quad (z_2 - z_0)(z_3 - z_0) \\
a_{31} &= (x_3 - x_0)(x_1 - x_0) + (y_3 - y_0)(y_1 - y_0) + \\
& \quad (z_3 - z_0)(z_1 - z_0)
\end{aligned} \quad (11)$$

Figure 10:
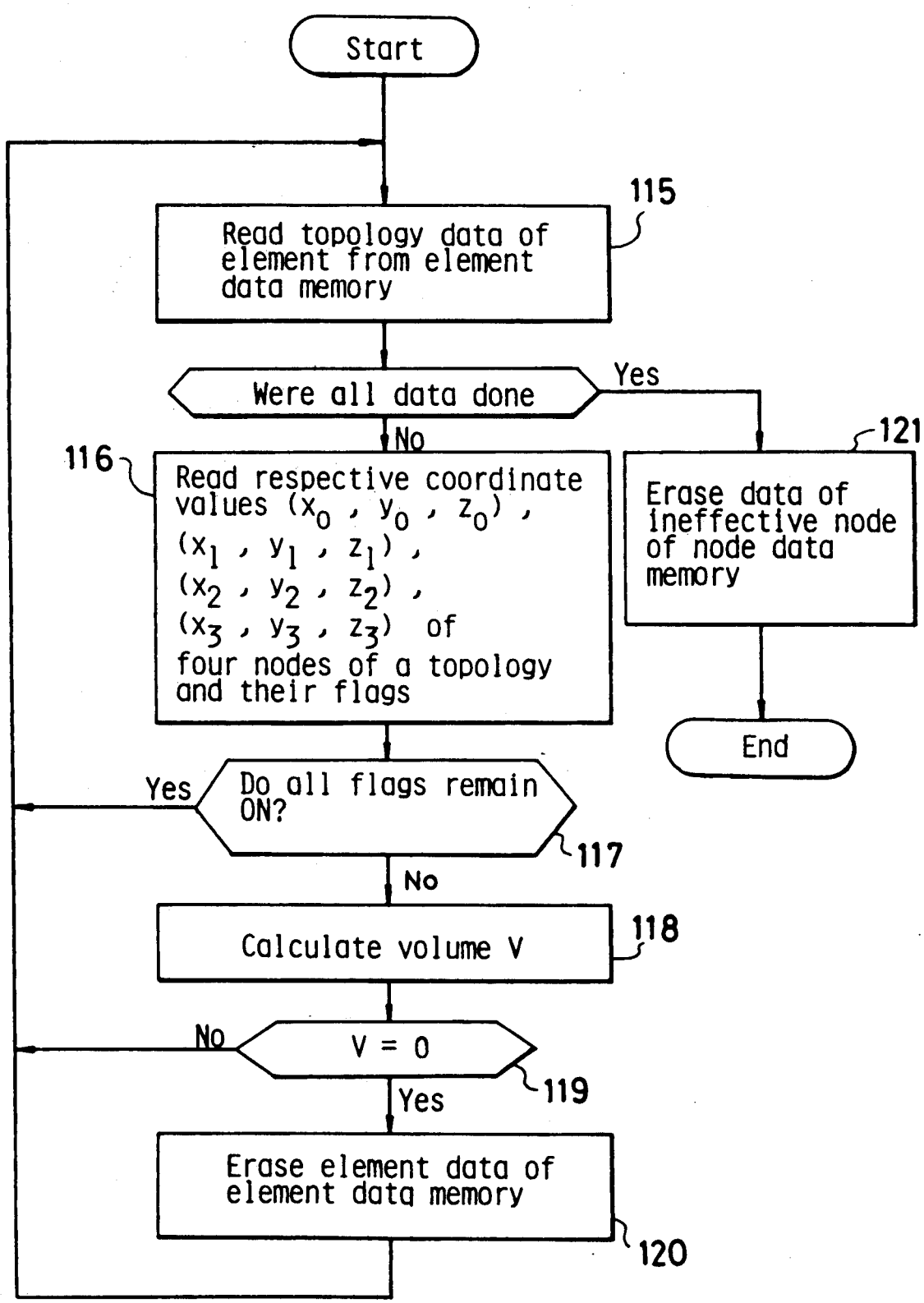
FIG. 10 is a flow chart of an erasing process of an element having no volume.

FIG. 10 is a flow chart showing the above-mentioned process for examining elements having no volume.

The topology data of an element is read out from the element data memory 6 (step 115). Then flags and coordinate values of the four nodes of the topology are read out from the node data memory 7 (step 116). Secondly, the flags of the four nodes are examined, and when at least one of four flags is OFF, that is, it is an outer node, the volume of the tetrahedron is calculated by means of equations (10) and (11) (steps 117 and 118). In case that the volume V is zero, the element is erased from the element data memory 6 (steps 119 and 120). On the contrary, all the flags are ON, namely they are inner nodes, since the tetrahedron is not distorted, other element data is read out. The above-mentioned steps 115–120 are applied to all the element data. Then, after the process, ineffective nodes of the erased element are erased by the same process as shown by the flow chart of FIG. 7 (step 121).

Figure 12A:
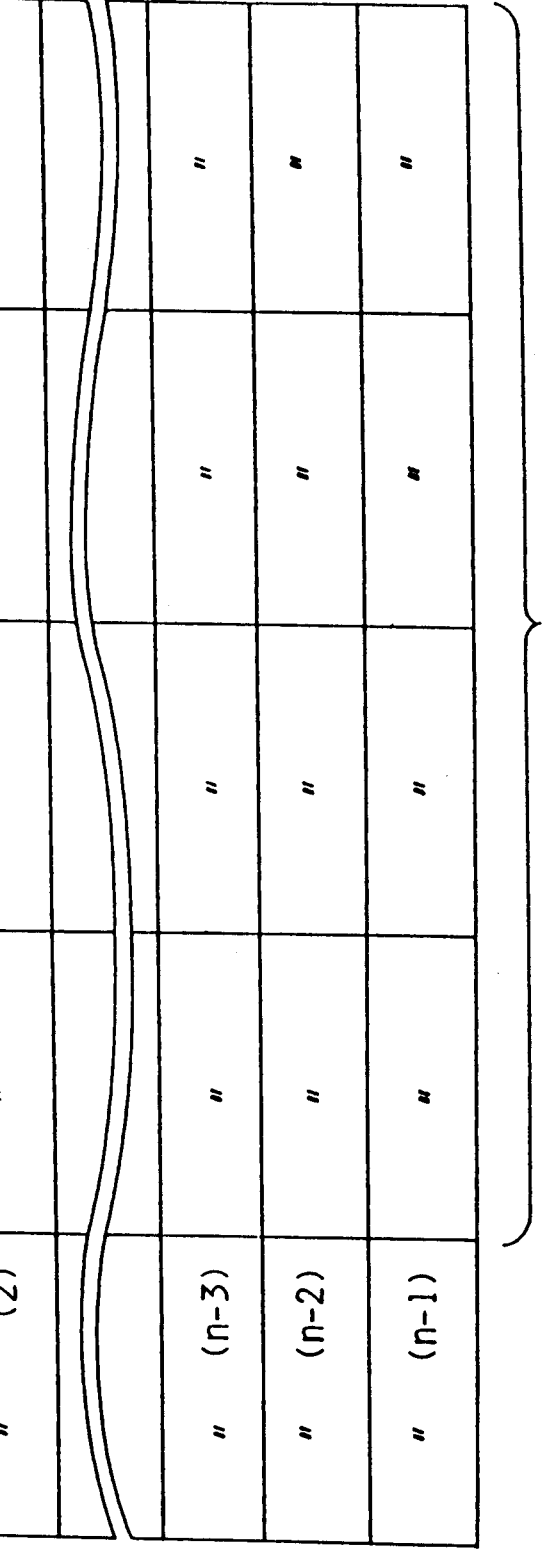
FIG. 12(a) is a format of element data.
Figure 12B:
FIG. 12(b) is a format of node data.

FIG. 12(a) shows format of topology data of the elements, and FIG. 12(b) shows format of the node data in the first embodiment of the present invention.

A second embodiment in accordance with the present invention is elucidated hereafter.

Figure 13:
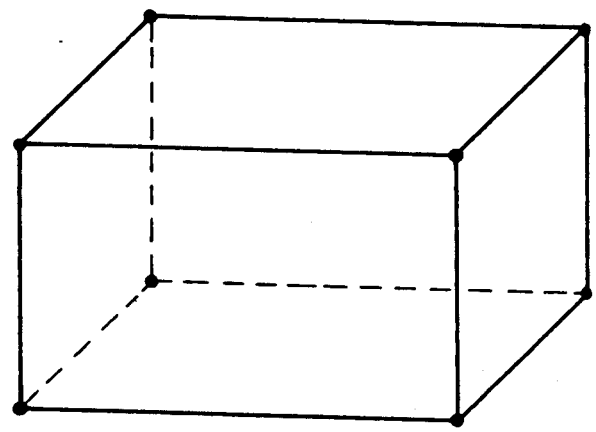
FIG. 13 is a perspective view of an element and its nodes in a second embodiment.

In the first embodiment, a three-dimensional geometry is divided into a plurality of tetrahedrons as shown in FIG. 3(b), but in the second embodiment the three-dimensional geometry is divided into a plurality of hexahedrons as shown in FIG. 13. In the case of hexahedron division, the process is almost identical with that of the first embodiment of tetrahedron division, but the processes for examining intersection of the element and the three-dimensional geometry in the step 123 and for examining shape of the element in the step 127 as shown in FIG. 11 are different from that of the first embodiment.

In the second embodiment, examination of the intersection of the element and the three-dimensional geometry is simplified in comparison with that of the tetrahedron. In case that a domain occupied with the hexahedron element is represented by the following relations (12A)

$$x_1 \leq x \leq x_2, \ y_1 \leq y \leq y_2, \ z_1 \leq z \leq z_2 \quad (12A),$$

and run-length data is represented by $(x, y_1, y_2, z)$, when the respective values are satisfactory for the following relations (12B)

$$\left.\begin{array}{c} x_1 \leq x \leq x_2 \text{ and } z_1 \leq z \leq z_2 \\ \text{and} \\ y_1 \leq y_2 \text{ and } y_1 \leq y_2 \end{array}\right\} \quad (12B)$$

the hexahedron element intersects with the run-length data. In case that the respective values are not satisfactory for the relations (12B), the hexahedron element does not intersect with the run-length data.

In the examination of the shape of the element, a volume of a tetrahedron, composed three-sides forming an apex, is examined. The above-mentioned examination is accomplished for all the apexes (8 apexes) of the hexahedron.

A third embodiment of the present invention is elucidated hereinafter.

Figure 14A:
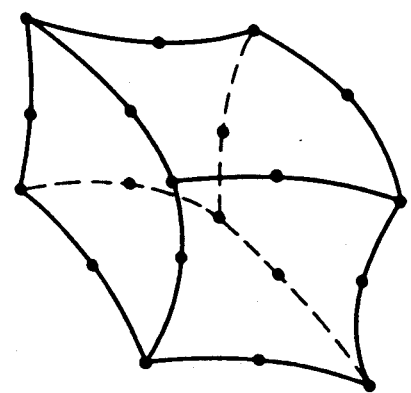
FIG. 14(a) and FIG. 14(b) are perspective views of isoparametric elements and its nodes in a third embodiment.
Figure 14B:
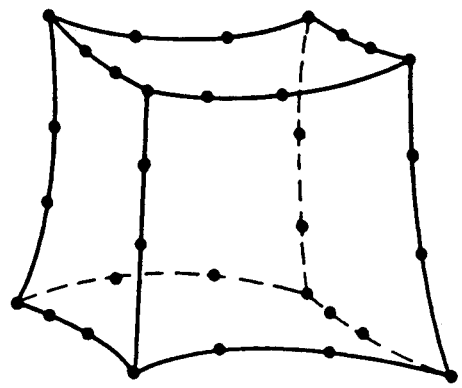

In analysis utilizing the finite element method, an isoparametric element as shown in FIG. 14 (a) or FIG. 14 (b) is used to improve precision of analysis in processing a complex three-dimensional geometry having many curved surfaces. In the third embodiment, the three-dimensional geometry is divided into such isoparametric elements.

In the embodiment, a process and steps for dividing the three-dimensional geometry are almost identical with that of the tetrahedron in the first embodiment or with that of hexahedron in the second embodiment. In the third embodiment, nodes are present not only at apexes of the element, but also are present on the respective sides. In the three-dimensional geometry processing method in accordance with the present invention, however, the above-mentioned difference is not essential. The process for the nodes on the sides is accomplished in a manner similar to the first embodiment.

Figure 16:
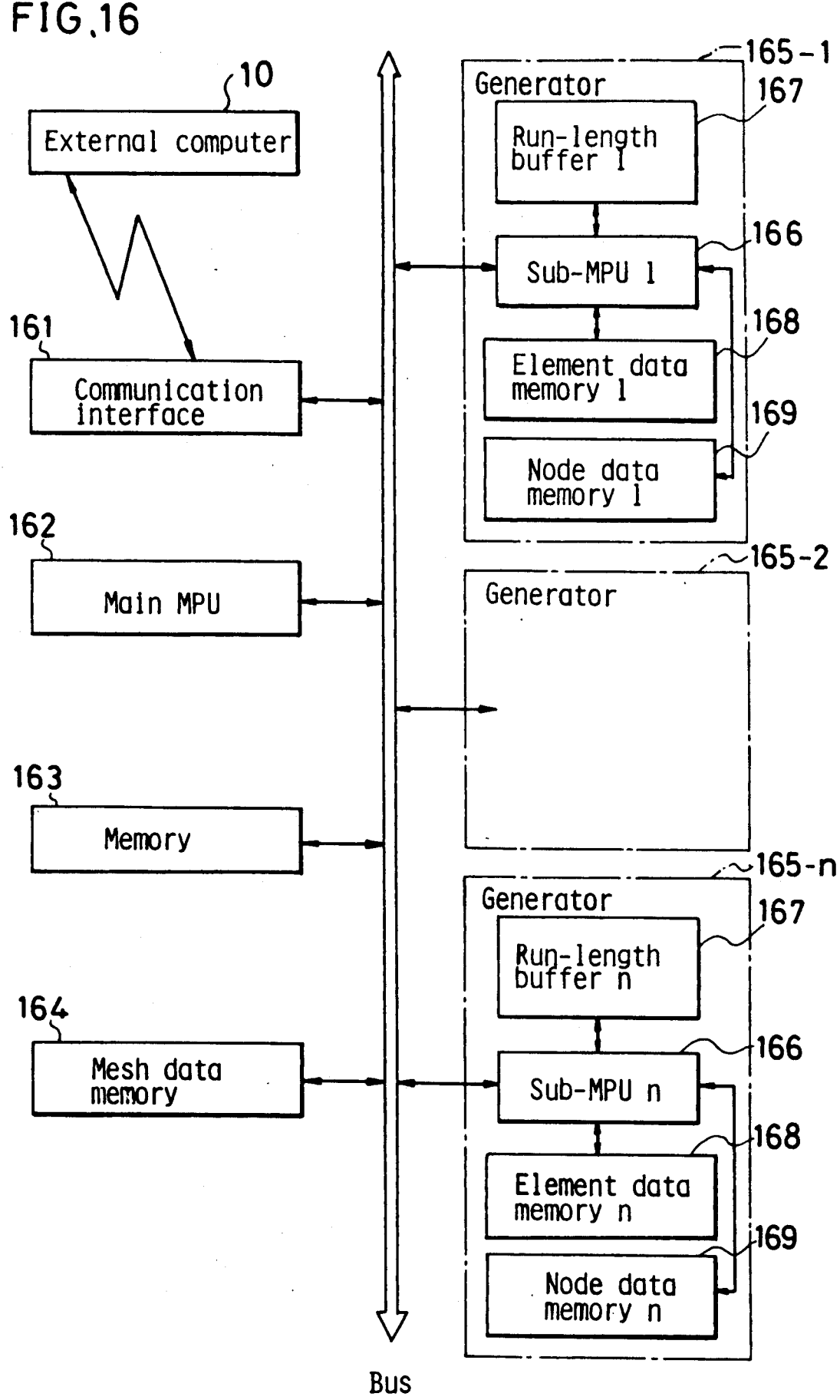
FIG. 16 is a block diagram of an apparatus for the forth embodiment.

FIG. 16 is a block diagram of a forth embodiment in accordance with the present invention. In the forth embodiment, a process of mesh-generation of the three-dimensional geometry is processed in parallel on plural geometry processing apparatus.

One of advantages in three-dimensional run-length data representation of object geometry or object domain is applicability to the parallel processing.

Figure 1A:
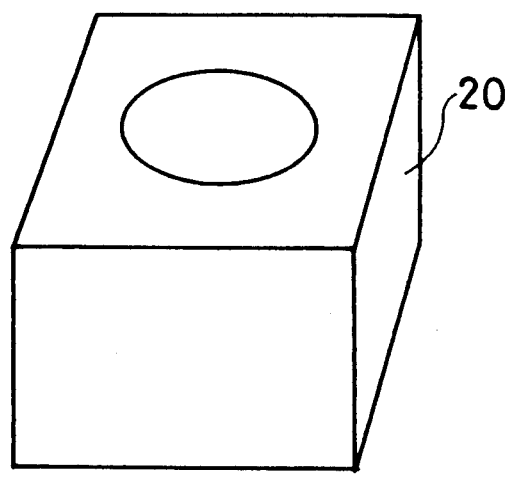
FIG. 1(a) is a perspective view of a solid geometry in general art.
Figure 1B:
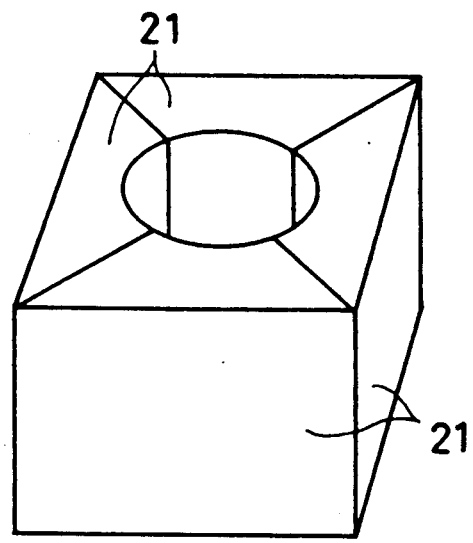
FIG. 1(b) is a perspective view of the solid geometry divided into sub-geometries in general art.
Figure 1C:
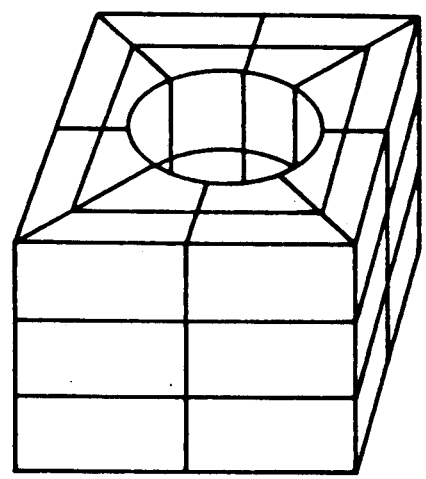
FIG. 1(c) is a perspective view of the solid geometry divided into elements for mesh-generation.
Figure 2A:
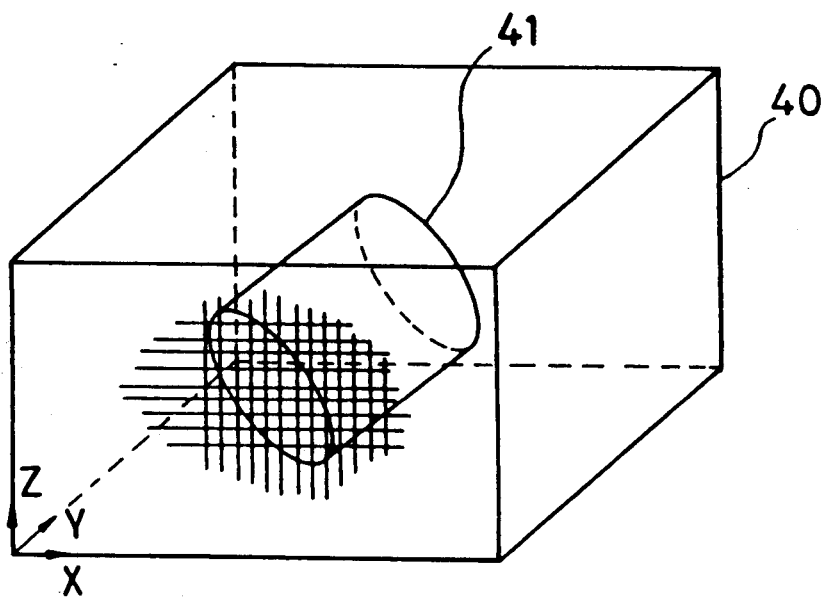
FIG. 2(a) is a perspective view showing three-dimensional run-length representation in an analysis domain in the present invention.
Figure 2B:
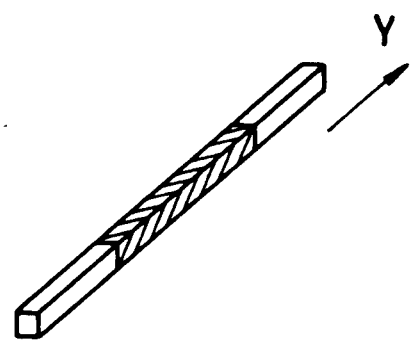
FIG. 2(b) is a perspective view of a scanning line in the analysis domain.
Figure 2C:
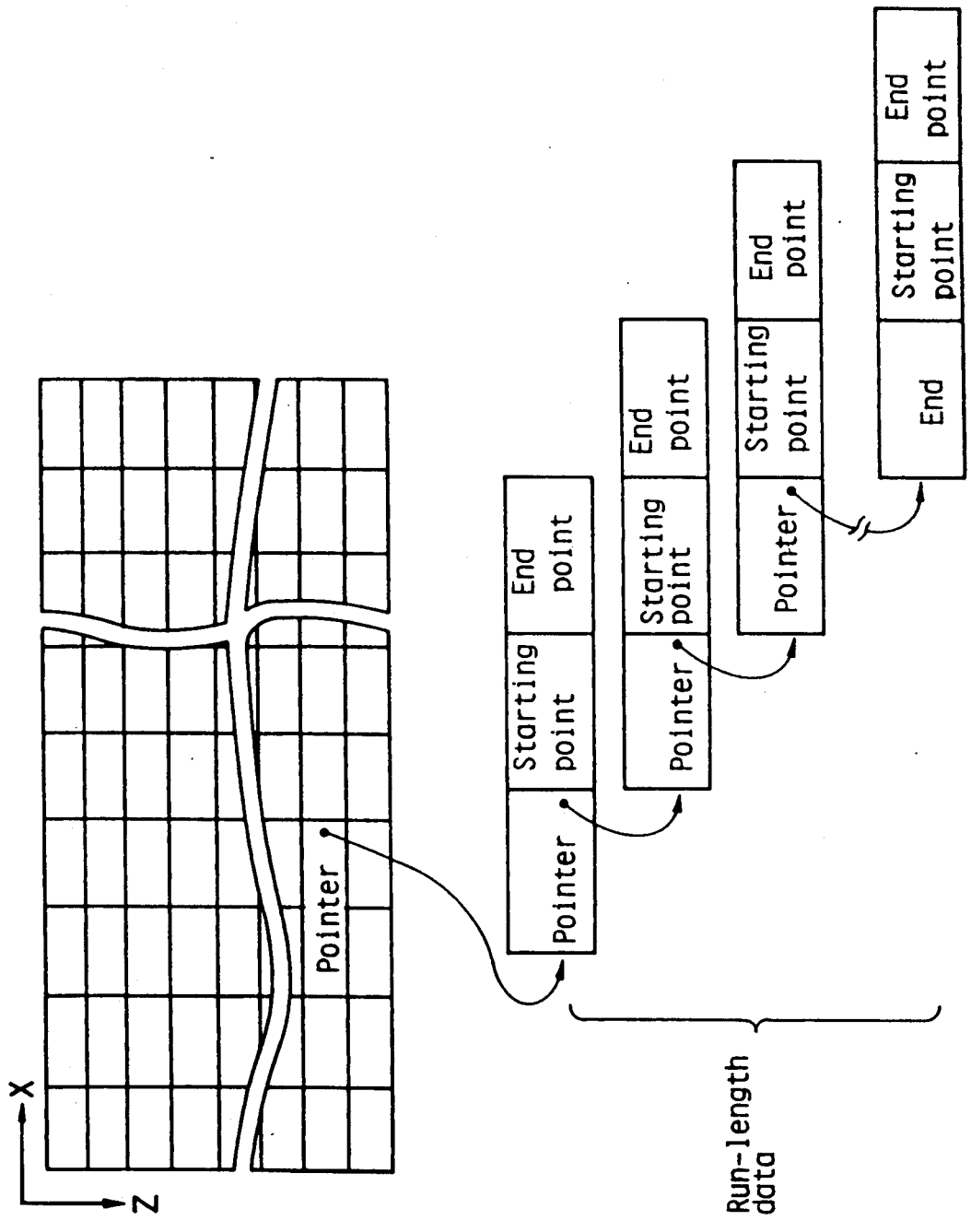
FIG. 2(c) is detailed data structure of run-length data in the present invention.
Figure 15A:
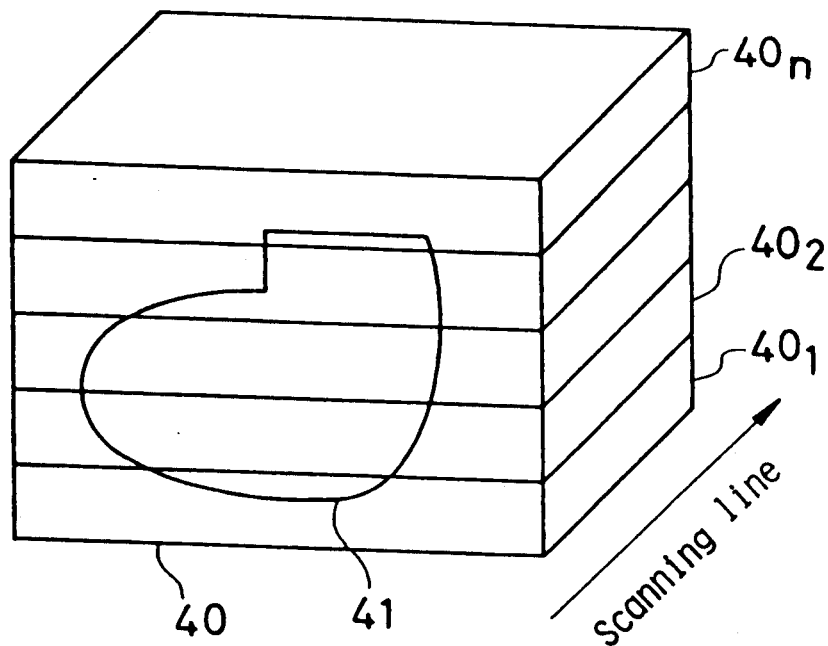
FIG. 15(a) and FIG. 15(b) are perspective views showing dividing methods of domains for a parallel processing in a forth embodiment.
Figure 15B:
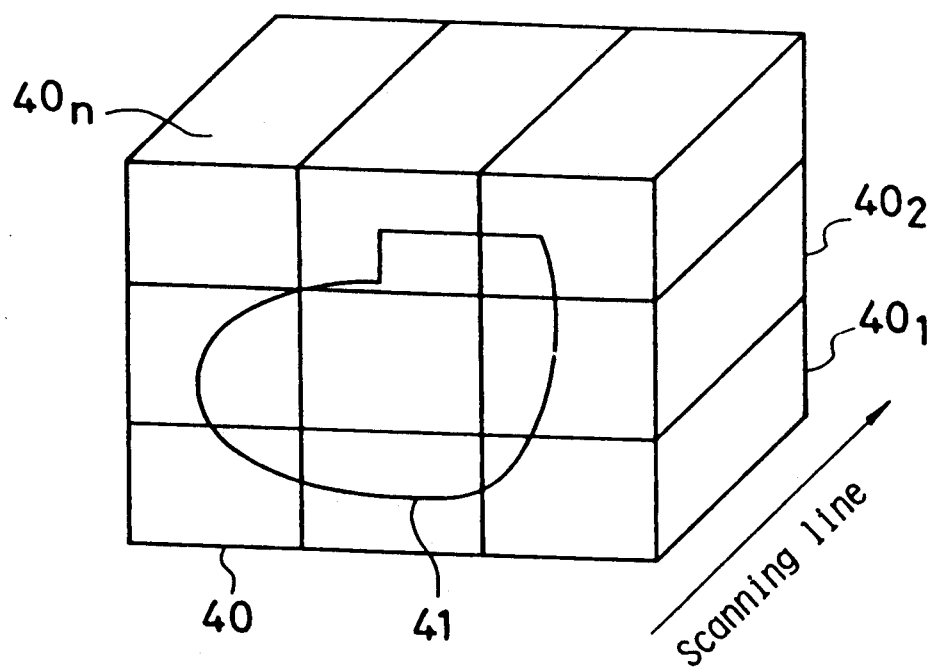

As shown in FIG. 2 (a), the three-dimensional run-length data representation has completely independent data structures separated by every scanning line. Therefore, as shown in FIG. 15 (a) or FIG. 15 (b), the analysis domain 40 is divided into a plurality of domains 40-1, 40-2, ... 40-n, and the respective domains can be shared among a plurality of geometry processing apparatus.

FIG. 16 is a block diagram of the forth embodiment in accordance with the present invention. Referring to FIG. 16, a communication interface 161, main MPU 162, memory 163 and a mesh-data memory 164 are identical with the corresponding devices as shown in FIG. 5. In the embodiment, a plurality of generators 165-1, 165-2, ... 165-n are provided for accomplishing mesh-generation which creates element data and node data from run-length data and mesh-data.

Each generator 165 is composed of a sub-MPU 166 for calculating and processing, run-length buffer 167 for memorizing three-dimensional run-length data, element data memory 168 for memorizing element data and a node data memory 169 for memorizing node data.

Detailed operation of the apparatus is elucidated hereafter. Run-length data as geometry data transmitted from an external computer through the communication interface 161 are shared among the respective generators 165-1, 165-2, ... 165-n by operation of the main MPU 162, and are memorized in the respective run-length buffer 167. In a similar manner, mesh-data transmitted from the external computer through the communication interface 161 are memorized in each mesh-data memory 164. Then element data and node data in the defined domain 40 are created from the mesh-data on the main MPU 162, and are shared among the respective generators 165-1, 165-2, ... 165-n corresponding to the assigned domain, and the element data and node data are memorized in each element data memory 168 and the node data memory 169. In the respective generators 165-1, 165-2, ... 165-n, the process which are identical with the first, the second and the third embodiment are accomplished in parallel. Then the element data and node data are created, and are memorized in each element data memory 168 and node data memory 169. The element data and the node data which are obtained in the above-mentioned process are transmitted to the external computer through the communication interface 161 by operation of the main MPU 162.

As mentioned above in the present invention, an arbitrary three-dimensional geometry is represented by three-dimensional run-length data, and the nodes of an element which are present outside of the three-dimensional geometry is shifted to the boundary thereof. Thus, the three-dimensional geometry is automatically divided into a plurality of elements without a preliminary division of the geometries. Furthermore, in various geometry such as tetrahedron, hexahedron or isoparametric elements, the same processing method and steps are applicable. Consequently, the above-mentioned processing method in accordance with the present invention enables division of the object geometry into isoparametric elements which is impossible in the prior art.

Furthermore, three-dimensional run-length data representation of the three-dimensional geometry makes it possible to realize parallel processing of three-dimensional element divisions, and also makes it possible to automatize a high speed three-dimensional mesh-generation.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A three-dimensioned geometry processing method comprising the steps of:

representing a three-dimensional object geometry having a surface by three-dimensional run-length data representation, dividing an analysis domain enclosing said three-dimensional object geometry into a plurality of elements of three-dimensional geometry having apexes designated as nodes, examining intersection of said elements to said three-dimensional object geometry by using said run-length data, selecting elements enclosed in said three-dimensional object geometry and all elements intersecting with the said surface of said three-dimensional object geometry, selecting nodes being present outward from said three-dimensional object geometry of said all elements intersecting with said surface of said three-dimensional object geometry, shifting said nodes being present outward from said three-dimensional object geometry onto the surface of said three-dimensional object geometry on the basis of a first predetermined rule, examining the shape of elements whose nodes are shifted onto said three-dimensional object geometry, and selecting elements conforming to a second predetermined rule, said second predetermined rule being used to select elements that conform to a preselected shape.

2. A three-dimensional geometry processing apparatus comprising:

a geometry processing computer for creating three-dimensional run-length data representing a three-dimensional object geometry having a surface, means for dividing an analysis domain enclosing said three-dimensional object geometry into a plurality of elements of three-dimensional geometry having apexes designated as nodes, means for examining intersection of said elements to said three-dimensional object geometry by using said run-length data, means for selecting all elements enclosed in said three-dimensional object geometry and all elements intersecting with said surface of said three-dimensional object geometry, means for creating data of nodes of said selected elements, means for selecting nodes being present outward from said three-dimensional object geometry of said all elements intersecting with said surface of said three-dimensional object geometry, means for shifting said nodes being present outward from said three-dimensional object geometry onto the surface of said three-dimensional object geometry on the basis of a first predetermined rule, means for examining shape of elements which nodes are shifted onto said three-dimensional object geometry, means for selecting elements conforming to a second predetermined rule, said second predetermined rule being used to select elements that conform to a preselected shape, and memories for memorizing said three-dimensional run-length data, element data which is topology data of said element, node data represented by coordinate values of said apexes and mesh data for instructing dividing manner of said analysis domain.

3. A three-dimensional geometry processing apparatus in accordance with claim 2 further comprising plural generators which are arranged in parallel in order to accomplish parallel operation of the analysis domain and are composed of:

memories for said three-dimensional run-length data, said elements data, data of said nodes, and sub-MPUs each comprising:

means for examining intersection of said elements and said three-dimensional object geometry, means for selecting all elements enclosed in said three-dimensional object geometry and all elements intersecting with said three-dimensional object geometry, means for creating data of nodes of said selected elements, means for selecting nodes being present outside of said three-dimensional object geometry, means for shifting said nodes being present outward from said three-dimensional object geometry onto the surface of said three-dimensional object geometry on the basis of a first predetermined rule, means for examining shape of elements of which nodes are shifted onto said three-dimensional object geometry, and means for selecting elements having shade conforming to a second predetermined rule.

* * * * *